US010275453B2

(12) United States Patent
Bennett et al.

(10) Patent No.: US 10,275,453 B2
(45) Date of Patent: *Apr. 30, 2019

(54) AUTOMATIC, UNSUPERVISED PARAPHRASE DETECTION

(71) Applicant: International Business Machines Corporation, Armonk, NY (US)

(72) Inventors: Laura J. Bennett, San Francisco, CA (US); Lakshminarayanan Krishnamurthy, Round Rock, TX (US); Niyati Parameswaran, Mountain View, CA (US); Sridhar Sudarsan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/615,189

(22) Filed: Jun. 6, 2017

(65) Prior Publication Data
US 2018/0329882 A1 Nov. 15, 2018

Related U.S. Application Data

(63) Continuation of application No. 15/594,057, filed on May 12, 2017.

(51) Int. Cl.
*G06F 17/27* (2006.01)
*G06N 99/00* (2019.01)
*G06F 17/30* (2006.01)

(52) U.S. Cl.
CPC .......... *G06F 17/2775* (2013.01); *G06F 17/27* (2013.01); *G06F 17/271* (2013.01);
(Continued)

(58) Field of Classification Search
None
See application file for complete search history.

(56) References Cited

U.S. PATENT DOCUMENTS 6,161,084 A  12/2000 Messerly et al.
7,392,185 B2   6/2008 Bennett
(Continued)

FOREIGN PATENT DOCUMENTS

CA  2484410 C  5/2005

OTHER PUBLICATIONS

List of IBM Patents or Applications Treated as Related.
(Continued)

*Primary Examiner* — Satwant K Singh
(74) *Attorney, Agent, or Firm* — Terrile, Cannatti & Chambers, LLP; Stephen A. Terrile

(57) ABSTRACT

A method is disclosed for identifying paraphrases in a natural language processing (NLP) system comprising: receiving a first phrase and a second phrase by a system; analyzing the first phrase and the second phrase to provide a semantic and structural hierarchical comparison assessment, the semantic and structural hierarchical comparison assessment having an associated semantic and structural hierarchical comparison assessment value; and determining whether the semantic and structural hierarchical comparison assessment value exceeds a predetermined paraphrase equivalency criteria; and, responsive to determining the semantic and structural hierarchical comparison assessment value exceeds the predetermined paraphrase equivalency criteria, classifying the second phrase as being a rewording of the first phrase.

6 Claims, 5 Drawing Sheets

(52) U.S. Cl.
CPC .... G06F 17/2785 (2013.01); G06F 17/30401 (2013.01); G06N 99/005 (2013.01)

(56) References Cited

U.S. PATENT DOCUMENTS

| | | | |
|---|---|---|---|
| 8,271,453 | B1 | 9/2012 | Pasca et al. |
| 8,886,572 | B2 | 11/2014 | Veeramachaneni |
| 8,930,191 | B2 | 1/2015 | Gruber et al. |
| 8,972,396 | B1 | 3/2015 | Zhang |
| 9,460,091 | B2 | 10/2016 | Doornenbal et al. |
| 9,659,084 | B1 | 5/2017 | Zhang |
| 2014/0095162 | A1 | 4/2014 | Kanevsky et al. |
| 2017/0091320 | A1 | 3/2017 | Psota et al. |
| 2017/0161275 | A1 | 6/2017 | Speer |
| 2017/0200081 | A1 | 7/2017 | Allen et al. |
| 2018/0075015 | A1* | 3/2018 | Bennett .............. G06F 17/2775 |
| 2018/0329881 | A1* | 11/2018 | Bennett .............. G06F 17/2775 |

OTHER PUBLICATIONS

Blacoe et al., "A comparison of vector-based representations for semantic composition." Proceedings of the 2012 Joint Conference on Empirical Methods in Natural Language Processing and Computational Natural Language Learning. Association for Computational Linguistics, 2012.

Baroni et al., "Nouns are vectors, adjectives are matrices: Representing adjective-noun constructions in semantic space." Proceedings of the 2010 Conference on Empirical Methods in Natural Language Processing. Association for Computational Linguistics, 2010.

Erk et al., "Paraphrase assessment in structured vector space: Exploring parameters and datasets." Proceedings of the EACL GEMS Workshop, pp. 57-65. (2009).

Vlachos et al., "Unsupervised and constrained Dirichlet process mixture models for verb clustering." Proceedings of the workshop on geometrical models of natural language semantics. Association for Computational Linguistics, 2009.

Alzahrani et al., "Understanding plagiarism linguistic patterns, textual features, and detection methods." IEEE Transactions on Systems, Man, and Cybernetics, Part C Applications and Reviews) 42.2 (2012): 133-149.

High, R., "The Era of Cognitive Systems: An Inside Look at IBM Watson and How it Works," IBM Redbooks, 2012.

Yuan et al., "Watson and Healthcare," IBM developerWorks, 2011.

IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.

Parameswaran et al., U.S. Appl. No. 15/266,754, filed Sep. 15, 2016, entitled System and Method for Automatic, Unsupervised Paraphrase Generation Using a Novel Framework that Learns Syntactic Construct While Retaining Semantic Meaning.

* cited by examiner

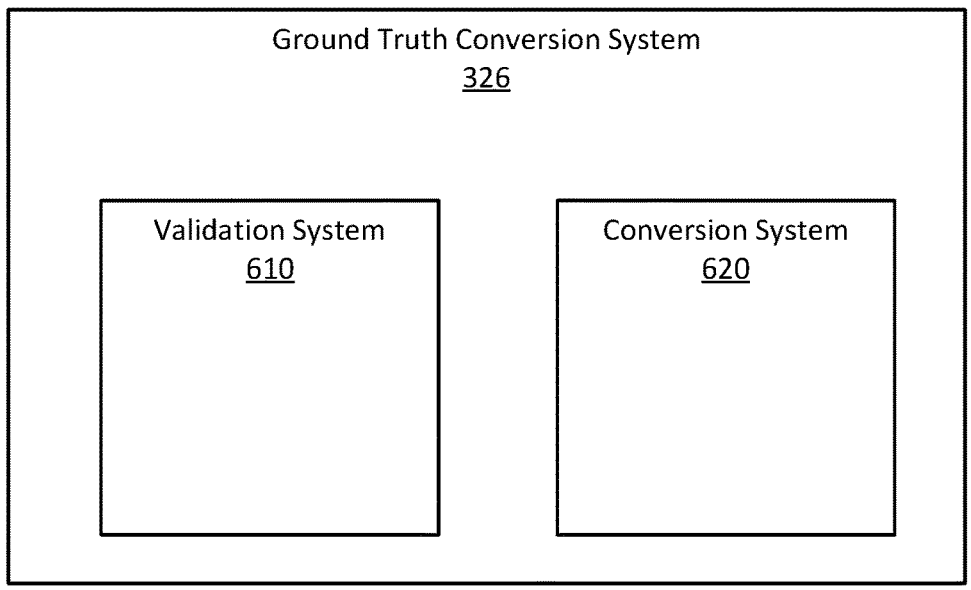

FIGURE 6

| Results | | | | |
|---|---|---|---|---|
| Operation | Reference | Description | Accuracy | F |
| Baseline | Mihalcea et al. (2006) | Cosine similarity with tf-idf weighting | 65.4% | 75.3 |
| ESA | Hassan (2011) | Explicit semantic space | 67.0% | 79.3 |
| LSA | Hassan (2011) | Explicit semantic space | 68.8% | 79.9 |
| RMLMG | Rus et al (2008) | Graph Subsumption | 70.6% | 80.5 |
| STS | Islam and Inkpen (2007) | Combination of string and semantic similarity | 72.6% | 81.3 |
| Vector Based Similarity | Milojevs et al (2014) | Additive composition of vectors and cosine similarity | 73.0% | 82.0 |
| matrixJcn | Fernando & Stevenson (2008) | Jcn WordNet similarity with matrix | 74.1% | 82.4 |
| Paraphrase Detection Operation | | Contextualized phrasal vectors using a combination of structural and semantic similarity | 74.8% | 82.6 |

AUTOMATIC, UNSUPERVISED PARAPHRASE DETECTION

BACKGROUND OF THE INVENTION

Field of the Invention

The present invention relates to training of cognitive computing systems, and more specifically, to techniques and mechanisms for automatic, unsupervised paraphrase detection.

Description of the Related Art

With the increased usage of computing networks, such as the Internet, users can easily be overwhelmed with the amount of information available from various structured and unstructured sources. However, information gaps abound as users try to piece together what they believe to be relevant during searches for information on various subjects. To assist with such searches, research has been directed to creating cognitive systems such as Question and Answer (QA) systems that take an input question, analyze the question, and return results indicative of the most probable answer or answers to the input question. QA systems provide automated mechanisms for searching through large sets of sources of content, e.g., electronic documents, and analyze them with regard to an input question to determine an answer to the question and a confidence measure quantifying the accuracy of the answer to the question.

SUMMARY OF THE INVENTION

A system, method, and computer-readable medium are disclosed for identifying paraphrases in a natural language processing (NLP) system comprising: receiving a first phrase and a second phrase by a system; analyzing the first phrase and the second phrase to provide a semantic and structural hierarchical comparison assessment, the semantic and structural hierarchical comparison assessment having an associated semantic and structural hierarchical comparison assessment value; and determining whether the semantic and structural hierarchical comparison assessment value exceeds a predetermined paraphrase equivalency criteria; and, responsive to determining the semantic and structural hierarchical comparison assessment value exceeds the predetermined paraphrase equivalency criteria, classifying the second phrase as being a rewording of the first phrase.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 6 shows a block diagram of a ground truth system.

FIG. 7 shows a table comparing various paraphrase detection methods.

DETAILED DESCRIPTION

Figure 1:
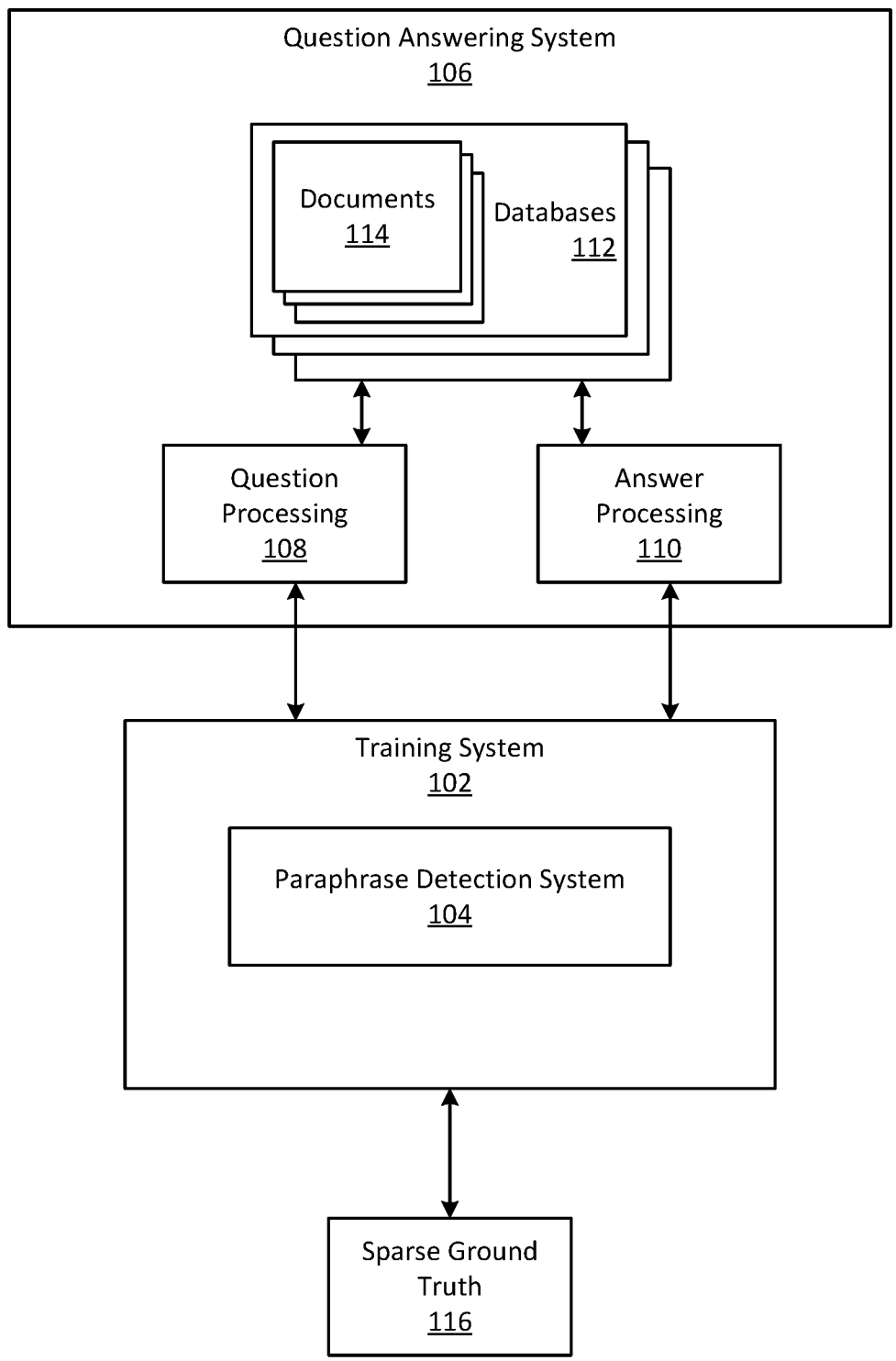
FIG. 1 shows a block diagram of a system that provides training of a question answering system.

Aspects of the present disclosure include a recognition that sparse ground truth, mediocre quality of training data, limited representations of novel queries and heavy biases and large time overheads associated with manual cluster creation present challenges to QA systems. Enriching Ground Truth, boosting the quality of training data, factoring in for novel queries and minimizing biases and time draws due to human intervention therefore emerge as preprocessing operations that are important to transitioning to a QA system as well as to provide an improved classification accuracy score. Aspects of the present disclosure include an appreciation that paraphrase detection that is focused at identification of intent is an important issue that has scope for many integral collaborations given its utility across applications like summarization, question answering, dialog, information extraction and information retrieval.

The quality of the responses provided by a QA system is often related to the training provided to the system. When a QA system is trained, ground truth is provided to the system. In various embodiments, the quality of system training, and in turn, the quality of the QA system is determined by the quality of the ground truth used to train the system. Therefore, the more comprehensive the ground truth, the higher the quality of the system training. Therefore, it is desirable to develop a system to automatically detect information such as paraphrases which are contained within a corpus. In various embodiments, detecting paraphrases enables increasing the quality of a ground truth so that a training system may provide higher quality training and a QA system may provide better answers to questions.

Accordingly, a system, method, and computer-readable medium are disclosed for performing an automatic, unsupervised paraphrase detection operation. In various embodiments, the paraphrase detection operation is performed via a paraphrase detection system. The paraphrase detection system provides an alternative to handling large volumes of text efficiently and to scale by not only automatically creating clusters based off user intent by understanding hierarchy in data but also by generating rewordings of user queries in cases of sparse and/or poor quality queries. In various embodiments, the paraphrase detection system includes a framework that uses both structural and semantic similarity to detect paraphrases. In various embodiments, the paraphrase detection system generates a contextualized phrasal vector space model to account for direct and indirect contexts within a corpus such as a sentence, a paragraph a passage/or document. In various embodiments, the paraphrase detection system provides a question and answer system with the ability to understand a hierarchy within clusters as opposed to independent clusters. In various embodiments, the paraphrase detection system provide a question and answer system with the ability to work in an unconstrained manner without expectation on domain specific data or training.

The present invention may be a system, a method, and/or a computer program product. In addition, selected aspects of the present invention may take the form of an entirely hardware embodiment, an entirely software embodiment (including firmware, resident software, micro-code, etc.), or an embodiment combining software and/or hardware aspects that may all generally be referred to herein as a "circuit," "module" or "system." Furthermore, aspects of the present invention may take the form of computer program product embodied in a computer readable storage medium, or media, having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a Public Switched Circuit Network (PSTN), a packet-based network, a personal area network (PAN), a local area network (LAN), a wide area network (WAN), a wireless network, or any suitable combination thereof. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language, Hypertext Precursor (PHP), or similar programming languages. The computer readable program instructions may execute entirely on the user's computer, partly on the user's computer, as a stand-alone software package, partly on the user's computer and partly on a remote computer, or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a sub-system, module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows a block diagram of a system 100 that provides training of a QA system in accordance with various embodiments. The system 100 includes a QA system 106 and a training system 102. The QA system 106 is a machine learning system that receives training from the training system 102. The training guides and adjusts the operation of the QA system 106 to improve the quality of the answers provided by the QA system 106. The QA system 106 is illustrative and is not intended to state or imply any limitation with regard to the type of QA mechanisms with which various embodiments may be implemented. Many modifications to the example QA system 100 may be implemented in various embodiments.

The system 100, including the QA system 106 and the training system 102 may be implemented on one or more computing devices (comprising one or more processors and one or more memories, and optionally including any other computing device elements generally known in the art including buses, storage devices, communication interfaces, and the like).

The QA system 100 operates by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

The QA system 106 includes question processing 108, answer processing 110, and databases 112. The databases 112 store documents 114 that serve as at least a part of the corpus of content from which answers to questions are derived. The documents 114 may include any file, text, article, or source of data for use in the QA system 106. The question processing 108 receives questions to be answered by the QA system 106. The questions may be formed using natural language. The questions may be provided by the training system 102 to facilitate training of the QA system 106, or may be provided by users of the QA system 106. The training system 102 may be coupled to the QA system 106 via a network, such as a local area network, a wide area network, the internet, or other communication system.

In some illustrative embodiments, the QA system 106 may be the IBM Watson™ QA system available from International Business Machines Corporation of Armonk, N.Y. The IBM Watson™ QA system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus for portions of the corpus of data that have some potential for containing a valuable response to the input question.

The IBM Watson™ QA system analyzes the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data.

Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question.

The question processing 108 receives input questions that are presented in a natural language format. That is, a user of the training system 102 may input, via a user interface, an input question to obtain an answer. In response to receiving the input question, the question processing 108 parses the input question using natural language processing techniques to extract major features from the input question, classify the major features according to types, e.g., names, dates, or any of a variety of other defined topics. The identified major features may then be used to decompose the question into one or more queries that may be submitted to the databases 112 in order to generate one or more hypotheses. The queries may be generated in any known or later developed query language, such as the Structure Query Language (SQL), or the like. The queries may be submitted to one or more databases 112 storing the documents 114 and other information.

The queries may be submitted to one or more databases 112 storing information about the electronic texts, documents, articles, websites, and the like, that make up the corpus of data/information. The queries are submitted to the databases 112 to generate results identifying potential hypotheses for answering the input question. That is, the submission of the queries results in the extraction of portions of the corpus of data/information matching the criteria of the particular query. These portions of the corpus are analyzed and used to generate hypotheses for answering the input question. These hypotheses are also referred to herein as "candidate answers" for the input question. For any input question, there may be hundreds of hypotheses or candidate answers generated that need to be evaluated.

The answer processing 110 analyzes and compares the language of the input question and the language of each hypothesis or "candidate answer" as well as performs evidence scoring to evaluate the likelihood that a particular hypothesis is a correct answer for the input question. As mentioned above, this process may involve using a plurality of reasoning algorithms, each performing a separate type of analysis of the language of the input question and/or content of the corpus that provides evidence in support of, or not, of the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis.

The answer processing 110 may synthesize the large number of relevance scores generated by the various reasoning algorithms into confidence scores for the various hypotheses. This process may involve applying weights to the various scores, where the weights have been determined through training of the statistical model employed by the QA system 106. The weighted scores may be processed in accordance with a statistical model generated through training of the QA system 106 that identifies a manner by which these scores may be combined to generate a confidence score or measure for the individual hypotheses or candidate answers. This confidence score or measure summarizes the level of confidence that the QA system 106 has about the evidence that the candidate answer is inferred by the input question, i.e. that the candidate answer is the correct answer for the input question.

In the answer processing 110, the resulting confidence scores or measures may be compared against predetermined thresholds, or other analysis may be performed on the confidence scores to determine which hypotheses/candidate answers are most likely to be the answer to the input question. The hypotheses/candidate answers may be ranked according to these comparisons to generate a ranked listing of hypotheses/candidate answers (hereafter simply referred to as "candidate answers"). From the ranked listing of candidate answers, a final answer and confidence score, or final set of candidate answers and confidence scores, may be generated and output to the submitter of the original input question.

The training system 102 facilitates configuration of the QA system 106 to provide answers to submitted questions and to improve the quality of the answers provided to submitted questions. The quality of the answers to a submitted question may be improved by selecting the candidate answers that are most relevant to the question. The quality of the answers provided by the QA system 106 is related to the ground truth that is used to train the QA system 106. Embodiments of the training system 102 improve the quality of the answers provided by the QA system 106 by enriching the ground truth that is used to train the QA system 106. Ground truth is questions, in the form of phrases and/or sentences, which are mapped to a known intent and/or answer. For example, the questions, "How can I close my account?" and "Is there a way I can shut my account?" may be mapped to an intent "closing an account." In another example, the questions, "What is the capital of California?" and "What is the capital of CA?" may be mapped to the answer "Sacramento." The QA system 106 then may be trained to determine that similar questions to the questions provided as part of the ground truth should provide similar answers because the intent of the questions is the same.

In one embodiment, the training system 102 provides a number of questions to the QA system 106. The questions provided by the training system 102 to the QA system 106 are referred to herein as "training questions." The QA system 106 processes the training questions and selects a number of candidate answers for each of the training questions. The QA system 106 provides the candidate answers to the training system 102. The candidate answers generated by the QA system 106 are compared by the training system 102 to correct answers in the ground truth. That is, the training performed by training system 102 may include the use of a known input question on a known training set of data with the goal being for the QA system 106 to generate the known correct answers found in the ground truth. By comparing the candidate answers to the known correct answers in the ground truth using logic found in the training system 102, the training system 102 may determine whether the QA system 106 is operating in the desired manner and where differences occur between the answers generated by the QA system 106 and the correct answers. In the event that the QA system 106 returns an incorrect answer to a training question, the training system 102 may adjust the logic and/or algorithms of the QA system 106, and more particularly, the answer processing 110 to decrease the confidence score for the incorrectly provided answer. In the event that the QA system 106 returns a correct answer to the training question, the training system 102 may adjust the logic and/or algorithms of the QA system 106, and more particularly, the answer processing 110 to increase the confidence score for the correctly provided answer. In this way, the training system 102 is able to train the QA system 106 to provide correct answers to input questions.

In some embodiments, the ground truth is provided to the training system 102 by customers, experts, and/or generated by the training system itself through, for example, crawling encyclopedias for questions and answers. In an embodiment, the training system 102 receives sparse ground truth 116 as the initial ground truth for use by the training system. Sparse ground truth 116 is ground truth for a particular intent that includes a limited number of questions that are mapped to that intent. For example, sparse ground truth 116 may include only two questions mapped to a single intent. Thus, the sparse ground truth 116 may provide lesser training capabilities for training system 102 than more enriched ground truth (i.e., ground truth with more questions mapped to the single intent). Because the questions contained in the sparse ground truth 116 are mapped to the same intent, they may be considered paraphrases of one another.

In order to provide a more robust training system 102, paraphrase detection system 104 is configured to receive the sparse ground truth 116 and detect additional paraphrases to increase the ground truth utilized by training system 102 to train QA system 106. For example, the training system 102 may receive only two questions, "How can I close my account?" and "Is there a way I can shut my account?" that are mapped to the intent "closing an account" as part of the sparse ground truth 116. The paraphrase detection system 104 is configured to detect the paraphrases within these two questions, and thus, increase the ground truth utilized to train QA system 106 or to generate an answer based upon the question. For example, the paraphrase detection system 104 may recognize that these questions could also be mapped to questions such as, "Is there a way for me to close my account?," "How can I shut my account?," "How could I close my account?," etc., as additional questions mapped to the intent "closing an account." Thus, the ground truth is automatically enriched by the training system 102 through the detection of additional paraphrases of the original questions in the sparse ground truth 116.

Figure 2:
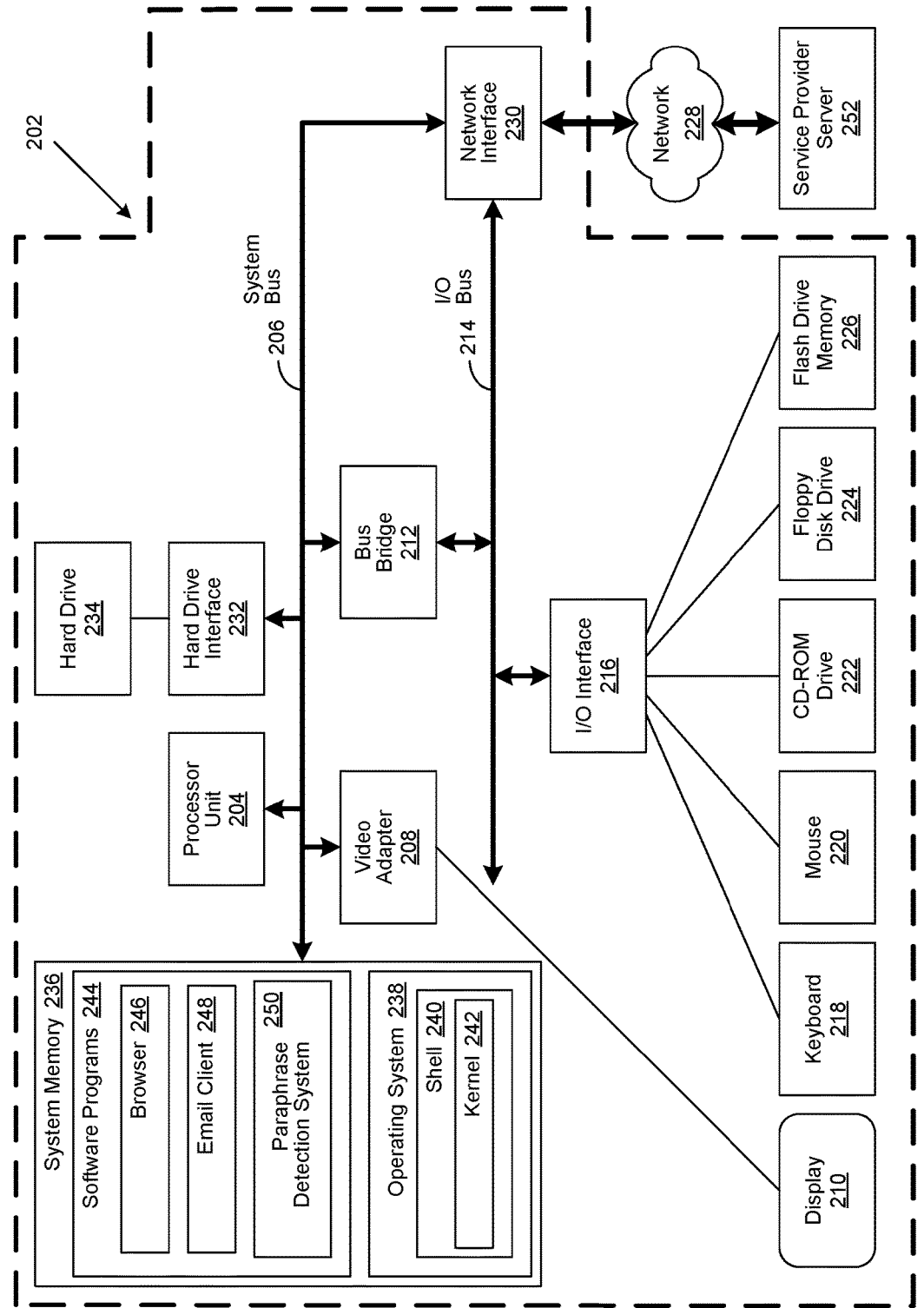
FIG. 2 shows a block diagram of an information processing system capable of performing computing operations.

FIG. 2 illustrates an information processing system 202, more particularly, a processor and common components, which is a simplified example of a computer system capable of performing the computing operations described herein. Information processing system 202 includes a processor unit 204 that is coupled to a system bus 206. A video adapter 208, which controls a display 210, is also coupled to system bus 206. System bus 206 is coupled via a bus bridge 212 to an Input/Output (I/O) bus 214. An I/O interface 216 is coupled to I/O bus 214. The I/O interface 216 affords communication with various I/O devices, including a keyboard 218, a mouse 220, a Compact Disk-Read Only Memory (CD-ROM) drive 222, a floppy disk drive 224, and a flash drive memory 226. The format of the ports connected to I/O interface 216 may be any known to those skilled in the art of computer architecture, including but not limited to Universal Serial Bus (USB) ports.

The information processing system 202 is able to communicate with a service provider server 252 via a network 228 using a network interface 230, which is coupled to system bus 206. Network 228 may be an external network such as the Internet, or an internal network such as an Ethernet Network or a Virtual Private Network (VPN). Using network 228, client computer 202 is able to use the present invention to access service provider server 252.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes the information processing system's 202 operating system (OS) 238 and software programs 244.

OS 238 includes a shell 240 for providing transparent user access to resources such as software programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. While shell 240 generally is a text-based, line-oriented user interface, the present invention can also support other user interface modes, such as graphical, voice, gestural, etc.

As depicted, OS 238 also includes kernel 242, which includes lower levels of functionality for OS 238, including essential services required by other parts of OS 238 and software programs 244, including memory management, process and task management, disk management, and mouse and keyboard management. Software programs 244 may include a browser 246 and email client 248. Browser 246 includes program modules and instructions enabling a World Wide Web (WWW) client (i.e., information processing system 202) to send and receive network messages to the Internet using HyperText Transfer Protocol (HTTP) messaging, thus enabling communication with service provider server 252. In various embodiments, software programs 244 may also include a paraphrase detection system 250 which can perform some or all of the functions of paraphrase detection system 104. In these and other embodiments, the paraphrase detection system 250 includes code for implementing the processes described hereinbelow. In one embodiment, the information processing system 202 is able to download the paraphrase detection system 250 from a service provider server 252.

The hardware elements depicted in the information processing system 202 are not intended to be exhaustive, but rather are representative to highlight components used by the present invention. For instance, the information processing system 202 may include alternate memory storage devices such as magnetic cassettes, Digital Versatile Disks (DVDs), Bernoulli cartridges, and the like. These and other variations are intended to be within the spirit, scope and intent of the present invention.

Figure 3:
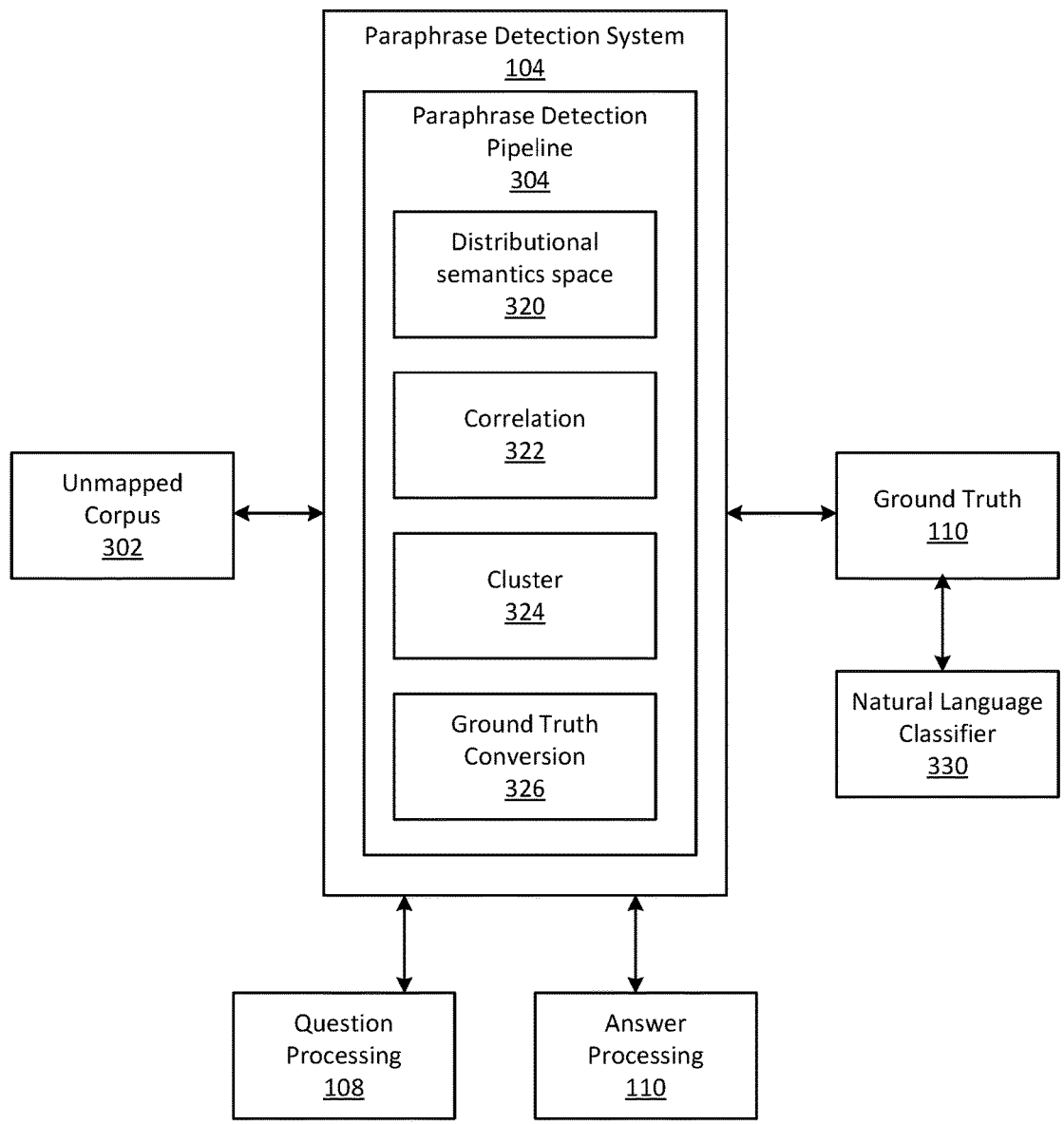
FIG. 3 shows a block diagram of a training system that includes a paraphrase detection system.

FIG. 3 shows a block diagram of a training system 102 that includes a paraphrase detection system 104. The paraphrase detection system 104 detect paraphrases that can then be used to identify ground truths to provide training of a QA system 106 and/or by the QA system 106 to provide answers to questions relating to the detected paraphrase. The training system 102 receives a corpus 302 which can include one or more paraphrases. In certain embodiments, the corpus 302 includes one or more unmapped questions.

The paraphrase detection system 104 includes tools for paraphrase detection by discovering rewordings of sentences across domains, separating hierarchical categories within domains, identifying the hierarchical categories of paraphrases with sparse data and expediting question and answer mapping related to the paraphrases. For the purposes of this disclosure, paraphrases may be defined as a restatement of text, passage or work giving the meaning in another form, thus a paraphrase has different syntax but the same semantics as the original text, passage or work. In certain embodiments, the original text, passage or work corresponds to a particular ground truth.

In certain embodiments, the paraphrase detection system 104 includes a paraphrase detection pipeline 304. In certain embodiments, the paraphrase detection pipeline 304 provides the paraphrase detection system 104 with the ability to attribute for both structural and semantic similarity by utilizing both vector-based and semantic-composition based frameworks as opposed to conventionally utilizing either one or the other framework. In certain embodiments, the paraphrase detection pipeline 304 provides the paraphrase detection system 104 with the ability to create contextualized phrasal vectors as opposed to simplistic word vectors thereby considering for context in which document/passage/sentence appears. In certain embodiments, the paraphrase detection pipeline 304 provides the paraphrase detection system 104 with the ability to understand hierarchy in data as opposed to naively flagging content into independent unrelated clusters. In certain embodiments, the paraphrase detection pipeline 304 provides the paraphrase detection system 104 with the ability to work unconstrained in an open domain setting without heavy expectations around classifier prerequisites.

In certain embodiments, the paraphrase detection pipeline 304 of the paraphrase detection system 104 includes one or more of a distributional semantics space system 320, a correlation system 322, a cluster system 324 and a ground truth system 326. The distributional semantics space system 320 performs a distributional semantics space operation on the received corpus. The correlation system 322 performs a correlation operation on the received corpus. The cluster system 324 performs a cluster operation on the received corpus. The ground truth system 326 performs a ground truth operation on the received corpus.

The distributional semantics space operation quantifies and categorizes semantic similarities between linguistic items of the corpus based on their distributional properties in samples of language data based upon a distributional hypothesis. In certain embodiments, the distributional hypothesis is derived from a semantic theory of language usage. The semantic theory of language usage maintains that words that are used and occur in the same contexts tend to purport similar meanings. The distributional hypothesis suggest that the more semantically similar two words are, the more distributionally similar they will be in turn and thus the more they will tend to occur in similar linguistic contexts. In certain embodiments, the distributional semantics space operation collects distributional information in high-dimensional vectors and defines distributional and/or semantic similarity in terms of vector similarities. A plurality of types of similarities can be extracted depending on which type of distributional information is used to collect the vectors.

The correlation operation identifies semantic roles and syntactic constructs of the received corpus and correlates the identified semantic roles and syntactic constructs of the received corpus. For the purposes of this disclosure a semantic role may be defined as the underlying relationship that a participant has with the main verb in a clause. Thus, the semantic role is the actual role a participant plays in some real or imagined situation, apart from the linguistic encoding of the situation. For the purposes of this disclosure, a syntactic construct may be defined as a grammatical construct having only free forms as immediate constituents and having no formal characteristics identifying the construct as a compound.

The cluster operation clusters the received corpus (e.g., questions) which references similar intent by understanding a hierarchy in the data associated with the received corpus. In certain embodiments, the hierarchy is created by establishing the most relevant concepts and the most relevant keywords present in the corpus. The cluster operation uses term frequency, term position, term length and term significance given context as features to make the determination of a naive hierarchy. In certain embodiments, a user may can provide their own taxonomy of the data which can be used if they don't want to rely on the hierarchy created by the classifier. In certain embodiments, the similar intent of the corpus is determined via a cognitive semantic approach in which the corpus is divided into meaning construction and knowledge representation.

The ground truth operation associates the detected paraphrase with a corresponding ground truth. When performing the ground truth operation, all queries in the ground truth which are determined to be paraphrases of each other are clustered in accordance with the intent of the queries.

The paraphrase detection system 104 may be used to provide an input to the QA system 106 to generate an answer to a question. The paraphrase detection system 104 may also be used to train the QA system 106. For example, the ground truth from the sparse ground truth 116 and the detected paraphrases may be mapped to an intent and may be provided to trainer 214 for training the QA system 106. In some embodiments, a ground truth is stored in a storage media (i.e., memory) in the trainer 214. The trainer 214 may train the QA system as discussed. For example, the trainer 214 may receive results of a known input question (i.e., a training question) from the QA system 216. By comparing the results to the known correct answers in the ground truth using logic found in the trainer 214, the trainer 214 may determine whether the QA system 106 is operating in the desired manner and where differences occur between the answers generated by the QA system 106 and the correct answers. In the event that the QA system 106 returns an incorrect answer to a training question, the trainer 214 may adjust the logic and/or algorithms of the QA system 106, and more particularly, the answer processing 110 to decrease the confidence score for the incorrectly provided answer. In the event that the QA system 106 returns a correct answer to the training question, the trainer 214 may adjust the logic and/or algorithms of the QA system 106, and more particularly, the answer processing 110 to increase the confidence score for the correctly provided answer. In this way, the training system 102 is able to train the QA system 106 to provide correct answers to input questions.

Figure 4:
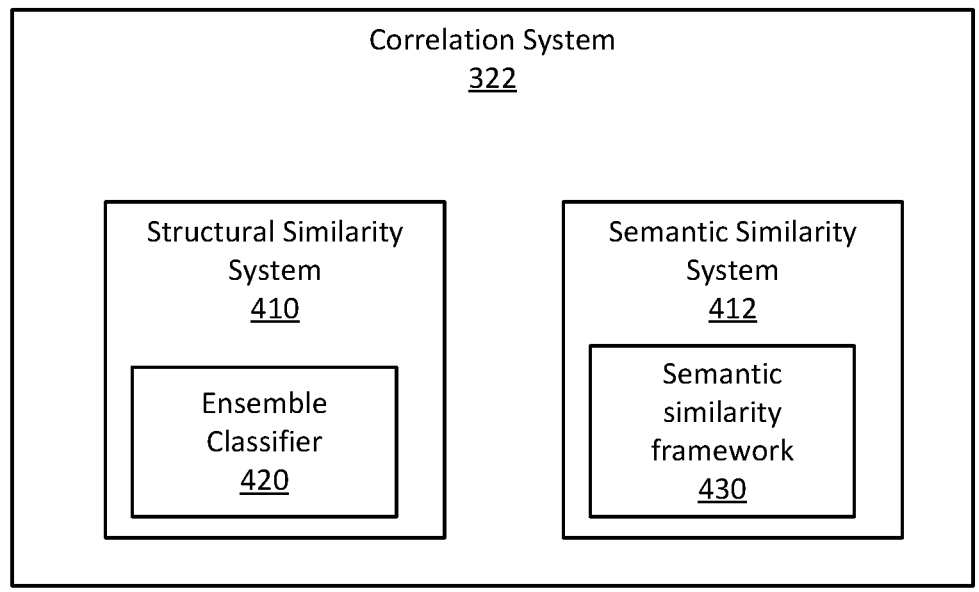
FIG. 4 shows a block diagram of a correlation system.

Referring to FIG. 4, a block diagram of the correlation system 322 is shown. More specifically, the correlation system 322 includes a structural similarity system 410 and a semantic similarity system 412. The structural similarity system 410 includes an ensemble classifier 420. The semantic similarity system 412 includes a semantic similarity framework 430. The structural similarity system 410 performs a structural similarity operation. The semantic similarity system 412 performs a semantic similarity operation.

When performing a structural similarity operation, a structural similarity score (x) is computed using the ensemble classifier 420 to perform an ensemble operation. For the purposes of this disclosure an ensemble classifier operation may be defined as an operation that constructs a set of classifiers and then classifies new data points by taking a weighted vote of their predictions. In various embodiments, the ensemble classifier operation may make use of one or more of a plurality of metrics including a Jaro metric, a Jaro-Winkler metric, a Dice metric, a Cosine metric and Levenshtein metric. In various embodiments, the ensemble classifier is augmented to function at a word level as opposed to a character level. The structural similarity operation provides a computation of an amount of rewordings across sentences by computing an edit distance in terms of a number of insertions, deletions, swaps, replacements (or a combination of these operations) on words across two sentences. Thereby computing a syntactic and structural overlap across various sentences.

When performing a semantic similarity operation, a semantic similarity score is computed. In certain embodiments, the semantic similarity score is computed using the semantic similarity framework 430. In certain embodiments, the semantic similarity framework includes one or more of the Word2Vec semantic similarity framework and the WordNet synsets semantic similarity framework.

In certain embodiments, the Word2Vec semantic similarity framework is augmented to compute phrasal vectors as opposed to simply computing distributional similarity scores across words. In certain embodiments, the augmentation includes an implementation of Latent Semantic Analysis operation in which given n sentences, the framework lists concepts referenced in those sentences. In certain embodiments, the Latent Semantic Analysis operation includes an implementation of a Latent Dirichlet Allocation operation in which given n sentences, the framework lists the topics referenced in those sentences. The semantic similarity framework enables the paraphrase detection system 104 to identify relevant concepts and topics associated with particular sentences. Thus, the semantic similarity framework 430 enables the paraphrase detection system to generate contextualized phrasal vectors. In certain embodiments the semantic similarity framework 430 generates a semantic similarity score (a) representing distributional semantics of the corpus.

In certain embodiments, the WordNet semantic similarity framework performs a plurality of state of the art (SOA) operations. In certain embodiments, the SOA operations includes one or more of a Hirst & St-Onge (HSO) operation, a Leacock & Chodorow (LCH) operation, a Resnik (RES) operation, a Banerjee & Pedersen (LESK) operation and a Wu & Palmer (WUP) operation. In certain embodiments, the WordNet semantic similarity framework is augmented to operate at a sentential level. In certain embodiments, the WordNet semantic similarity framework uses a machine translation metric bilingual evaluation understudy (BLEU) operation which enables computation of a semantic compositionality score (b), which may also be considered a structural similarity score. In certain embodiments, the semantic compositionality score represents n gram overlaps or n gram co-occurrence counts across sentences.

The paraphrase detection system 104 generates an aggregated similarity score. In certain embodiments, the aggregated similarity score is generated using the semantic similarity score and the semantic compositionality score. In certain embodiments, the aggregated similarity score is computed as 0.4x+0.6(a+b). When so computing the aggregated similarity score, the paraphrase detection system 104 weights the structural similarity at 0.4 and the semantic similarity at 0.6. In certain embodiments, the weighting of the structural similarity and the semantic similarity may be adjusted to account for specific domains and/or use cases.

Figure 5:
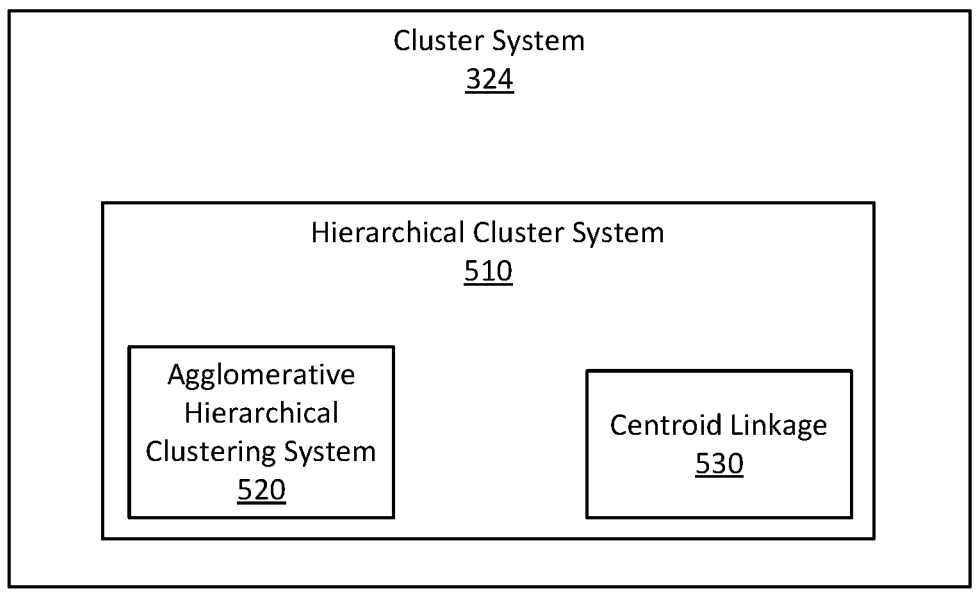
FIG. 5 shows a block diagram of a cluster system.

Referring to FIG. 5, a block diagram of the cluster system 324 is shown. The cluster system 324 includes a hierarchical cluster system 510. In certain embodiments, the hierarchical cluster system 510 includes an agglomerative hierarchical clustering system 520. The hierarchical clustering system performs hierarchical clustering operations. In certain embodiments, the hierarchical clustering operations may include top-down or bottom-up type hierarchical clustering operations. A bottom-up clustering operation treats each document as a singleton cluster at the outset and then successively merge (or agglomerate) pairs of clusters until all clusters have been merged into a single cluster that contains all documents. Bottom-up hierarchical clustering is therefore considered a hierarchical agglomerative clustering (HAC) operation. In certain embodiments, the hierarchical cluster system 510 includes a centroid linkage system 530. When performing the clustering operation, the paraphrase detection system 104 groups sentences by threshold structural and semantic similarity scores using a hierarchical clustering operation.

In certain embodiments, centroid linkage is utilized as the linkage criterion and an agglomerative hierarchical clustering operation is performed. The linkage criterion determines the distance between sets of observations as a function of the pairwise distances between operations. Centroid linkage clustering (also referred to as unweighted pair group method clustering (UPGMC)) is an example of a linkage criterion which focuses on cluster creation around centroids. For the purposes of this disclosure, an agglomerative hierarchical clustering operation may be defined as a method of cluster analysis which builds a hierarchy of clusters using a bottom up approach where each observations starts in its own cluster and pairs of clusters are merged when moving up the hierarchy.

The agglomerative hierarchical clustering operation groups sentences on the basis of the aggregated syntactic and semantic similarity. In certain embodiments, a hierarchical clustering metric is used when performing the agglomerative hierarchical clustering operation. In certain embodiments, the hierarchical metric corresponds to the aggregated similarity score calculated when performing the structural and semantic similarity operation. It will be appreciated that the hierarchical clustering metric influences the shape of sentence group clusters.

In certain embodiments, the linkage criterion comprises the distance between sets of observations as a function of the pairwise distance between the observations.

Referring to FIG. 6, the ground truth system 326 includes a validation system 610 and a conversion system 620. The validation system 610 performs a validation operation. The ground truth system 620 performs a ground truth operation.

In certain embodiments, the validation operation validates the accuracy of the classification of the paraphrase using a standard state of the art standard corpora. More specifically, in certain embodiments, the standard corpora comprise datasets that have been released to validate the performance of a classifier.

After the accuracy of the classification of the paraphrase is validated, the ground truth operation associates the paraphrase with a respective ground truth. In certain embodiments, the paraphrase and the respective ground truth may be stored within the training system 102.

Referring to FIG. 7, a table comparing various paraphrase detection methods is shown. More specifically, it has been empirically determined that under certain conditions a paraphrase detection operation which identifies contextualized phrasal vectors using a combination of structural and semantic similarity provides a QA system with an accuracy of 74.8% and an F score of 82.6. In certain embodiments, the F score provides a statistical analysis of a binary classification. The F score (also referred to as F1-score or F-measure) is a measure of a test's accuracy. The F score considers both the precision (p) and the recall (r) of the test to compute the score. When computing the F score, a number of positive results (p) is divided by the number of all positive results, and a number of correct positive results (r) is divided by the number of positive results that should have been returned.

The paraphrase detection system 104 of the present disclosure computes the syntactic and semantic relatedness between two sentences in the same language when determining related paraphrases. For example, the paraphrase detection system 104 might receive the following questions as an input corpus: "Are your running shoes comfortable?, "How do you quantify shoe comfort for running shoes?," "What adds to shoe comfort when running?," "What are your most comfortable hiking shoes?," "What is a good shoe for the Tahoe trail?," "Can you recommend a versatile shoe that can be used for hiking and travel?," "What shoes work best for hikes?," "What are some factors to consider when buying shoes for water trails?." "Why should I buy water resistant trail boots?." Also, for example, the paraphrase detection system 104 might receive the following questions as an input corpus: "What are the best fabrics for water resistant boots?," "I am traveling to Nepal and need shoes for biking," "I will be biking extensively over summer. What shoes should I get?," "Why would I need shoes specifically for biking?," "Are BestShoes a green company?," "Are you an environment friendly company?," "Do spikes work best for sprints?," "I am starting sprint training. What should I buy?," "What are good sprint shoes?."

Some of the example questions and/or statements contain certain queries which are paraphrases of each other (i.e., they are referencing similar entities thereby being suggestive of the same intent. In certain embodiments, the paraphrase detection system 104 receives such data in a txt or csv format and then performs an automated unsupervised clustering operation to render clusters that has such queries grouped in accordance to intent. The manner in which the queries are grouped in accordance to their intent is by leveraging paraphrase detection pipeline to compute the syntactic and semantic relatedness across sentences in an agglomerative manner. Some of the phrases may be clustered around a cluster description of "shoe_comfort", other around a cluster description of "shoes_hikes", others around a cluster description of "fabrics_water_resistant_boots, other around a cluster description of "shoes_biking", other around a cluster description of "environment_company" and other around a cluster description of "shoes_sprints." In certain embodiments, the phrases may be clustered around more than one cluster description.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Consequently, the invention is intended to be limited only by the spirit and scope of the appended claims, giving full cognizance to equivalents in all respects.

What is claimed is:

1. A computer-implementable method for identifying paraphrases in a natural language processing (NLP) system comprising:

receiving a first phrase and a second phrase by a system;

analyzing the first phrase and the second phrase to provide a semantic and structural hierarchical comparison assessment, the semantic and structural hierarchical comparison assessment having an associated semantic and structural hierarchical comparison assessment value; and determining whether the semantic and structural hierarchical comparison assessment value exceeds a predetermined paraphrase equivalency criteria;

responsive to determining the semantic and structural hierarchical comparison assessment value exceeds the predetermined paraphrase equivalency criteria, classifying the second phrase as being a rewording of the first phrase.

2. The method of claim 1, wherein:

the structural hierarchical comparison assessment includes a vector based and a semantic based framework.

3. The method of claim 2, wherein:

the first phrase and the second phrase are in a single language.

4. The method of claim 3, further comprising:

utilizing the first phrase and the second phrase in a ground truth classifier for a system capable of answering questions.

5. The method of claim 1, wherein:

the semantic and structural hierarchical comparison assessment comprises performing an ensemble operation on the first phrase and the second phrase, the ensemble operation providing a structural similarity score.

6. The method of claim 1, wherein:

the semantic and structural hierarchical comparison assessment comprises performing a semantic similarity operation, the semantic similarity operation providing a semantic similarity score.

* * * * *